Dec. 2, 1969    W. J. HORGAN, JR    3,481,302
JAM CLEAT

Filed June 20, 1968    2 Sheets-Sheet 1

INVENTOR.
William J. Horgan, Jr.

BY

Paul & Paul
ATTORNEYS.

INVENTOR.
William J. Horgan, Jr.

United States Patent Office 3,481,302
Patented Dec. 2, 1969

3,481,302
JAM CLEAT
William J. Horgan, Jr., Pittsburgh, Pa., assignor to Blumcraft of Pittsburgh, Pittsburgh, Pa., a firm of Pennsylvania
Filed June 20, 1968, Ser. No. 738,689
Int. Cl. B63b 21/08; F16g 11/10; F16b 2/18
U.S. Cl. 114—218                                     17 Claims

ABSTRACT OF THE DISCLOSURE

A cleat for a line attached to the sail of a sailboat comprising a shaft held at both ends in a frame and a pair of toothed wheels mounted on the shaft, that rotate upon and slide along the shaft to grip the line.

BACKGROUND OF THE INVENTION

This invention relates to a jam cleat for the line of sail in a sealing vessel. More particularly, the invention covers a jam cleat which has two toothed wheels both of which are cam actuated to grip and hold the line when it is pulled in one direction and which can be readily released from engagement with the line so that the line may be freely played out.

In the prior art, jam cleats for use as line holding devices principally comprised either a pair of ears having serrated faces disposed in opposing relation, each ear being pivoted about a point, as for example the device shown in U.S. Patent 3,265,032 or a single rotatable member disposed on a shaft, as for example the device shown in U.S. Patent 3,120,043.

SUMMARY OF THE INVENTION

The present invention comprises a shaft fixedly mounted in a frame and having disposed thereon a pair of toothed wheels having cam hubs that ride on the shaft and are governed for opening and closing by means of followers, which are mounted on the shaft so that as each wheel is rotated about its axis it slides axially along the shaft. In the preferred embodiment of this invention, means are provided in engagement with each wheel and the frame to urge the wheels toward one another along the shaft. The cams are so designed that if both wheels are rotated in the same direction, they will either move toward one another, or away from one another, depending on the direction of rotation.

In an alternate embodiment of my invention, a fairlead is provided on the frame to guide a rope or line into the toothed portion of the jam cleat.

In a still further alternate embodiment of my invention, means are provided to quickly release the wheels from their tightly closed position gripping the line, so that they may freely rotate and disengage the rope or line clamped therebetween.

Accordingly, an object of this invention is to provide an improved means for retaining and releasing a rope or line under tension on a sailing vessel.

This and other objects of the invention will become apparent from the following description with reference to the accompanying drawings.

Figure 1:
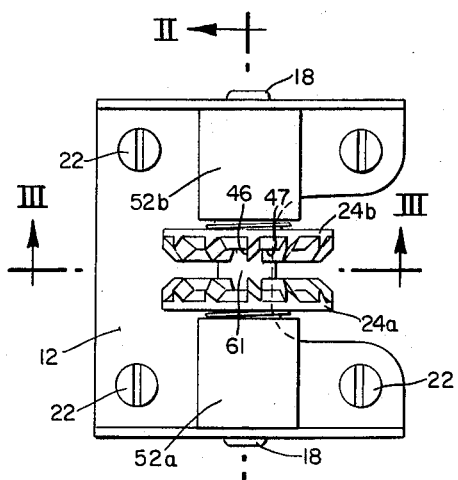
FIG. 1 is a plan view of one embodiment of my invention.
Figure 4:
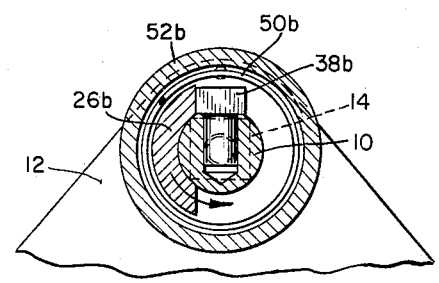
FIG. 4 is a partial section taken as indicated by the lines and arrows IV—IV in FIG. 2.

Referring as needed to FIGS. 1 through 4, I shall describe one embodiment of my invention. A cylindrical shaft 10 is mounted in a frame 12, and is prevented from rotating in said frame by means of the square ends 16 in the frame. The ends of the shaft 10 are tapped and have screws 18 disposed therein to retain the shaft axially in the frame 12. The frame 12 has a plurality of holes in the base thereof to accommodate any suitable mounting means such as screws 22.

Mounted upon the shaft 10 are two wheels 24a and 24b. Each wheel has a hub 26a and 26b respectively, extending from one radial face thereof. Each hub has a cylindrical bore therein, as at 28a and 28b, which is disposed in sliding engagement on the shaft 10. Each hub terminates in a curved, cam surface 30a and 30b respectively. These surfaces advance axially from the outer ends of the hubs toward one another, while proceeding in the same direction of travel about the shaft 10 when viewed from the end. The resulting curved surfaces provide cams which are preferably the mirror image of each other.

Follower pins 38a and 38b are rotatably mounted in the shaft 10. The sides of the head of the pins are disposed in sliding engagement with the cam surfaces, and are preferably flat surfaces; as, for example, would be the case if the head of the pin was either a square or rhombus.

The pins lie, preferably, in the same axial plane and are spaced along the shaft so as to predetermine the travel of the hubs in accordance with the cammed surfaces with which they are in sliding contact.

The radial face of each wheel which faces the other wheel has a plurality of teeth, formed thereon, as at 42a and 42b respectively. The teeth extend radially outwardly from a point which is closely adjacent to the shaft 10. Each tooth (as for example the tooth designated 44 in FIG. 3) has a leading edge 45 which is formed by the intersection of a surface 46 (FIG. 1) which is perpendicular to the face 47 of the wheel and preferably lies in a radial plane, and a surface 48 which is angled in a plane from the first-mentioned surface 46 toward the face 47 of the wheel. The intersection lines or edges all lie in the same transverse plane which is perpendicular to the axis of the shaft.

Figure 2:
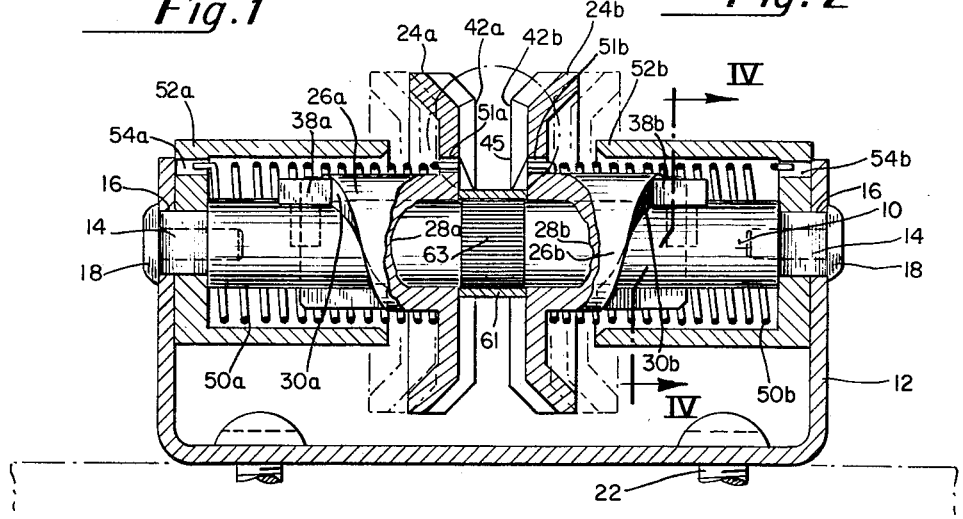
FIG. 2 is a section taken as indicated by the lines and arrows II—II in FIG. 1.
Figure 3:
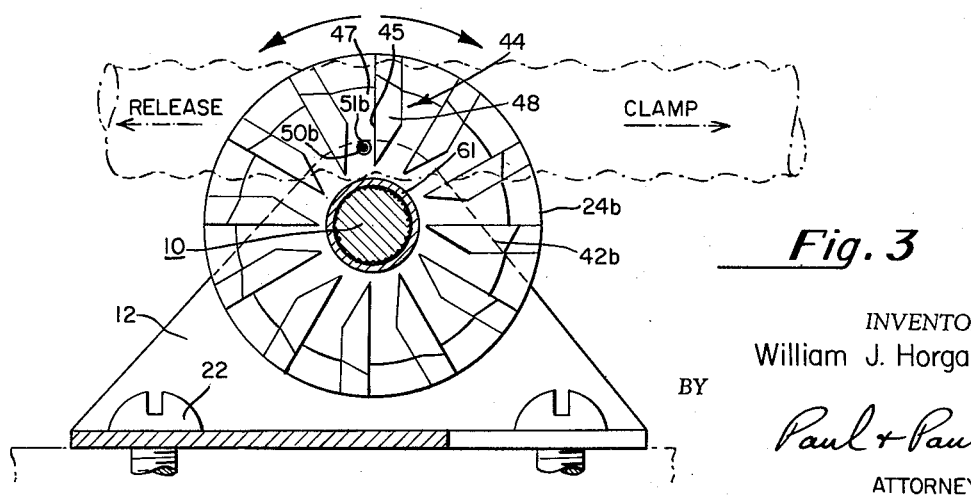
FIG. 3 is a section taken as indicated by the lines and arrows III—III in FIG. 1 showing a line in phantom position.
Figure 6:
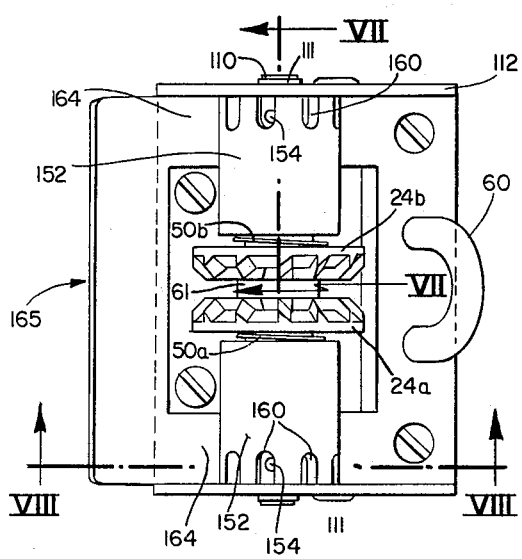
FIG. 6 is a plan view of the alternate embodiment shown in FIG. 5.
Figure 5:
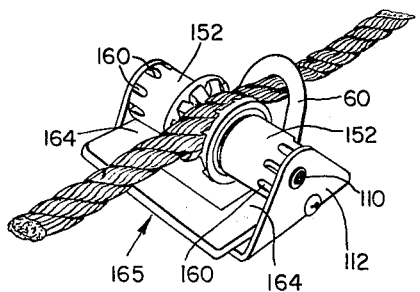
FIG. 5 is a perspective of an alternate embodiment of my invention showing a portion of a line in operative engagement with my device.

Referring particularly to FIGS. 2 and 3, note that the leading edge 45 is disposed to engage a rope or line being drawn through the cleat in the "clamp" direction shown by the arrow. This exerts a force on the wheel and causes it to rotate in a clockwise direction as shown in FIG. 3. This force likewise causes the wheels to move axially, as for example from the positions shown in phantom in FIG. 2 to the positions shown in full lines in FIG. 2. This is because the cam surfaces of the hubs coact with the pins in the shaft as the wheels rotate.

As will be seen from FIG. 2, when both hubs are rotated so that the wheels occupy the phantom positions, the spacing is such that the teeth are in slight engagement with the line. Consequently, when the line is pulled in the "clamp" direction it will always cause the hubs to rotate and will always cause the teeth to clamp even tighter and retain the line. If however, the line is pulled in the opposite direction (i.e. the "RELEASE" direction shown in FIG. 3), the wheels will rotate to their full open position and the rope or line will slide relatively freely across the beveled surfaces (as 48) of the teeth. The line can be completely removed from the cleat by pulling it up and out in the "RELEASE" direction.

To provide for ease in inserting the line into the cleat, the teeth on the radial surfaces of the wheels continue at an angle of preferably 45 degrees to the vertical (as in FIG. 2) outwardly along the outer circumferential surfaces of the wheels.

In order to clamp lines of a smaller diameter than that illustrated, i.e. lines which would not ordinarily engage the leading edges of the teeth on both wheels at the same time, it is necessary to draw the line against one of the wheels so as to force it in engagement with the teeth. Then, as the wheel rotates to the closed position, it will force the line into engagement with the other wheel and both wheels will act to clamp the line. To provide positive gripping action for a variety of diameters of line, I have modified my invention to include means for urging the wheels to the fully closed position in their normal condition, i.e. when no rope or line is in the cleat. In one embodiment, I have provided coil springs which are preferably disposed about the hubs. Each spring, 50a and 50b, is fixed to its adjacent wheel by means of a small hole 51a and 51b respectively through which the end of the spring is inserted. To protect the springs, I have provided barrels 52a and 52b which are fixed against rotation by means of the square holes in the ends thereof which are fitted onto the square ends 14 of the shaft 10, as shown in FIG. 2. In the base of each barrel is a small hole 54a and 54b respectively into which is inserted the other end of the spring. The springs are disposed in compression to maintain a force against the wheels and urge them into the closed position.

The gap left between the opposing faces of the wheels can be designed to be large or small as desired, depending on the type of service for which a jam cleat is to be used. To maintain a minimum gap I have provided a cylindrical sleeve 61 fitted over the shaft 10 and retained thereon by an interference fit between the inner cylindrical surface of the sleeve and the knurled surface 63 at the center of the shaft. The ends of the sleeve abut the opposed radial faces of the wheels as shown in FIG. 2.

Note in FIG. 3 that the teeth on the wheel are disposed completely around the radial face 47 of the wheel. While it is not necessary for the operation of this device to have teeth which completely cover this surface, because of the limits on the range of movement, it is nevertheless desirable to make the teeth go all the way around the radial surface so that the cleat can work well at the various angles at which the line may approach the cleat. Furthermore, as the line is drawn around a larger arc through the cleat, more teeth will grip it and it will be held more securely.

In an alternate embodiment of my invention (FIGS. 5 through 8), I provide a fairlead or loop 60 in advance of the toothed wheels which is preferably mounted directly to the frame 112. The fairlead or loop is designed to guide the line into the toothed wheels for those applications where the line in use would be disposed at such an angle that it would be pulled up and out of the cleat. The loop 60 is formed of a piece of rod which is preferably circular in cross-section and is affixed to the frame in any suitable manner (not shown). Alternatively, the loop can be integrally formed with the frame. The inner arcuate face 61 FIG. 8 of the inverted U-shaped loop 60 is in a horizontal plane with the upper portions of the teeth, so that even if the line was pulled vertically upward from the side of the loop which is most remote from the cleat it would still pass through the gap between the wheels of the cleat and remain in engagement therewith.

In a still further embodiment of my invention, I provide a means for quickly releasing the clamped line when conditions warrant, as for example, in extremely heavy weather or wind, when pulling the line up and out of the cleat becomes difficult. In this embodiment, the cylindrical shaft 110 is supported at either end in round holes in the frame 112, so as to be freely rotatable therein. The shaft is retained by C-clips 111 in grooves at either end. The toothed wheels and cam hubs and pins are the same as those previously described, like numbers designating like parts. Once again, it is preferable to have a spring or some other means for urging the toothed wheels to the closed position. In this embodiment the springs are fixed in barrels in a similar fashion to that previously described. However, the barrels themselves have been modified.

Figure 8:
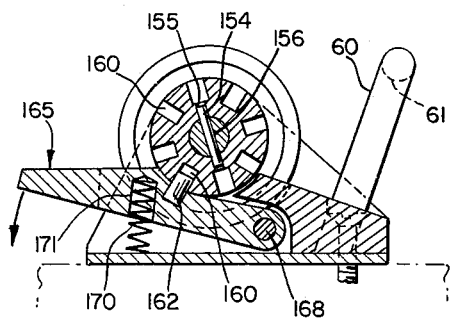
FIG. 8 is a section taken as indicated by the lines and arrows VIII—VIII in FIG. 6.
Figure 7:
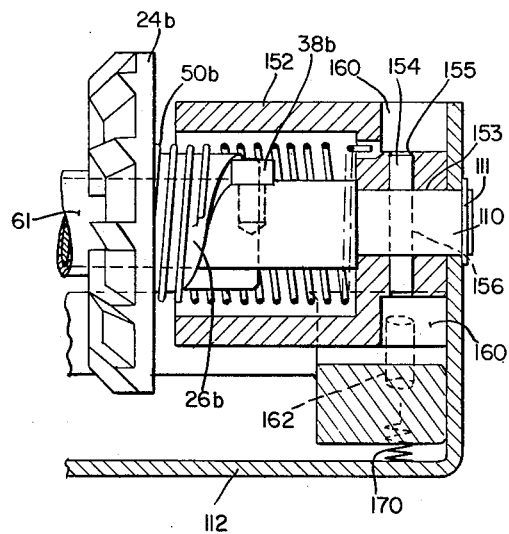
FIG. 7 is a partial section taken as indicated by the lines and arrows VII—VII in FIG. 6.

In this embodiment the ends of the shaft 110 are cylindrical, and the barrels 152 have a bore 153 therein which fits over the cylindrical end of the shaft. A pin 154 is press-fitted through a hole 155 in the barrel and a hole 156 in the shaft to fixedly connect the barrel to the shaft, as shown in FIG. 7 and FIG. 8. In the outer cylindrical surface of the barrel, a plurality of slots have been cut, which are preferably blind at one end and open at the other end. Each slot 160 is cut sufficiently deep to accommodate a pin 162 FIG. 8. One such pin is mounted in either leg 164 of release bar 165. Each leg of the release bar is rotatably mounted in the frame for rotation as by means of a pin 168. A spring 170 is disposed in a hole 171 in each leg of the release bar and exerts a force between the base of the frame 112 and the release bar 165; forcing the bar upwardly so that the pin 162 is normally urged to engage one of the slots 160 in the barrels 152. The pins engage the slots on both barrels simultaneously.

As in the previous embodiment, when the moving line engages the teeth of the wheels, they are either rotated into a closed, clamped position, or rotated into an open position, depending on the direction of travel of the line. If the line was clamped so tightly by reason of the forces exerted on it that it would be difficult or impossible, through the use of normal hand force, to disengage the line by pulling it up and out or back and up and out of the cleat, then it is only necessary to depress the bar 165 in the direction of the arrow shown in FIG. 8 and thereby remove the pins 162 from the slots 160 in the barrels 152. With the pins removed, the mechanism is released, and the barrels will freely rotate in the direction of the force supplied through the line. Thus, the line will be quickly played out. To stop the barrels from rotating and automatically clamp the line again, one need merely remove his hand from the release bar 165, and the springs 170 will urge the release bar and the pins 162 into engagement with the slots 160 in the barrels 152, thereby clamping the barrels and shaft 110 securely against further rotation.

It will be understood that various changes in the details, materials and arrangement of parts which have been herein described and illustrated in order to explain the nature of this invention may be made by those skilled in the art within the principle and scope of the invention as expressed in the following claims.

What is claimed is:
1. A jam cleat comprising:
 (a) a frame;
 (b) a shaft mounted in said frame;
 (c) a plurality of wheels disposed on said shaft in sliding engagement therewith and in spaced relation to one another; and
 (d) means disposed on said shaft and coacting with said wheels to move said wheels on said shaft into closer juxtaposition responsive to rotation of said wheels in one direction, and to increase the spaced relationship between said wheels responsive to rotation of said wheels in the opposite direction.
2. The invention of claim 1 wherein said plurality of wheels comprises two wheels, each having teeth on at least one radial face, said faces being opposed to one another.

3. The invention of claim 1 wherein said means comprises a plurality of followers mounted on said shaft a separate follower being in sliding contact with each of said wheels.

4. The invention of claim 3 wherein said wheels each comprise a radial portion having teeth thereon, and a hub having a cam surface thereon in sliding contact with said follower to coact therewith upon rotation of said wheels.

5. The invention of claim 2 wherein means are provided in engagement with said wheels to urge said wheels toward one another on said shaft.

6. The invention of claim 5 wherein said last mentioned means comprises a plurality of springs held in compression, at least one spring being attached to each of said wheels.

7. An invention of claim 6 wherein barrel means are disposed about said springs.

8. A jam cleat comprising:
 (a) a frame;
 (b) a shaft rotatably mounted in said frame;
 (c) a plurality of toothed wheels rotatably disposed on said shaft in sliding engagement therewith and in spaced relation to one another;
 (d) actuating means disposed on said shaft and coacting with said wheels to move said wheels on said shaft into closer juxtaposition responsive to rotation of said wheels in one direction, and to increase the spaced relationship between said wheels responsive to rotation of said wheels in the opposite direction; and
 (e) control means mounted on said frame and coacting with said shaft to restrain and permit rotation of said shaft on manual actuation of said control means.

9. The invention of claim 8 wherein said control means comprises a plurality of slots in said shaft; lever means pivoted at one end to said frame; means engaging said lever means, to urge said lever means toward said shaft; and engagement means disposed on said lever means to engage the slots in said shaft upon appropriate positioning of said lever means and said shaft.

10. The invention of claim 8 wherein means are provided in engagement with said wheels to urge said wheels toward one another on said shaft.

11. The invention of claim 10 wherein said last-mentioned means comprises a plurality of springs held in compression, at least one spring being attached to each of said wheels.

12. The invention of claim 8 wherein said plurality of wheels comprises two wheels, each having teeth on at least one radial face, said radial faces being opposed to one another.

13. The invention of claim 8 wherein said means comprises a plurality of followers mounted on said shaft a separate follower being in sliding contact with each of said wheels.

14. The invention of claim 13 wherein said wheels each comprise a radial portion having teeth thereon, and a hub having a cam surface thereon in sliding contact with said follower to coact therewith upon rotation of said wheels.

15. The invention of claim 11 wherein barrel means are disposed about said springs.

16. The invention of claim 9 wherein said engagement means comprises at least one pin connected to said lever means.

17. A jam cleat comprising:
 (a) a frame;
 (b) a shaft rotatably mounted in said frame;
 (c) a pair of wheels disposed on said shaft in sliding engagement therewith and for rotation thereabout, and in spaced relation to one another, each of said wheels having a plurality of teeth along at least one radial face thereof, the radial faces of said wheels having said teeth disposed thereon being in opposed relationship to one another, said wheels having hubs thereon extending outwardly along said shaft, each of said hubs having a cam surface thereon;
 (d) said shaft having follower means attached thereto and in sliding contact with said cam surfaces, to coact therewith upon rotation of said wheels to move said wheels on said shaft into closer juxtaposition upon rotation of said wheels in one direction, and to increase the space relationship between said wheels upon rotation of said wheels in the opposite direction;
 (e) barrel means disposed about said shaft and fixedly connected thereto at one end thereof, said barrel means being open-ended at the other end thereof;
 (f) spring means disposed in said barrel means and connected thereto at one end thereof, and at the other end thereof connected to said wheels to urge said wheels along said shaft toward one another; and
 (g) control means mounted on said frame and coacting with said shaft and barrel means to restrain and permit rotation of said shaft on manual actuation of said control means, said control means comprising a plurality of slots in each of said barrel means; lever means comprising a U-shaped member having two legs, each of said legs being pivoted at the end thereof to said frame; spring means engaging said lever means to urge said lever means towards said shaft; and a plurality of pins at least one of which is disposed in each of said legs to engage said slots in said barrel means upon appropriate positioning of said lever means and said shaft.

References Cited

UNITED STATES PATENTS

| 1,841,460 | 1/1932 | Thatcher | 269—232 |
| 2,748,368 | 5/1956 | Gookin | 24—127 |
| 3,081,575 | 3/1963 | Meisner | 24—127 |
| 3,120,043 | 2/1964 | Henley | 24—132 |

FOREIGN PATENTS 399,305  10/1933  Great Britain.

MILTON BUCHLER, Primary Examiner

J. E. PITTENGER, Assistant Examiner

U.S. Cl. X.R.

24—127, 132; 269—232

PO-1050
(5/69)

UNITED STATES PATENT OFFICE
CERTIFICATE OF CORRECTION

Patent No. 3,481,302      Dated December 2, 1969

Inventor(s) William J. Horgan, Jr.

It is certified that error appears in the above-identified patent and that said Letters Patent are hereby corrected as shown below:

Column 1, line 20, delete "sealing" and insert--sailing--.
Column 2, line 15, after "ends" and before "16" insert--14 of the shaft 10 which fit snugly in the square holes--.

SIGNED AND
SEALED
FEB 24 1970

(SEAL)
Attest:

Edward M. Fletcher, Jr.
Attesting Officer

WILLIAM E. SCHUYLER, JR.
Commissioner of Patents